US012731620B2

(12) United States Patent
Lu et al.

(10) Patent No.: US 12,731,620 B2
(45) Date of Patent: Sep. 8, 2026

(54) HARD DISK, FIXING DEVICE, AND HARD DISK MODULE

(71) Applicant: Fulian Precision Electronics (Tianjin) Co., LTD., Tianjin (CN)

(72) Inventors: Wen-Hu Lu, Tianjin (CN); De-Yang Tian, Tianjin (CN); Shu-Tong Wang, Tianjin (CN)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 0 days.

(21) Appl. No.: 18/817,530

(22) Filed: Aug. 28, 2024

(65) Prior Publication Data

US 2025/0078877 A1 Mar. 6, 2025

(30) Foreign Application Priority Data

Aug. 28, 2023 (CN) ........................ 202311094830.0

(51) Int. Cl.
*G11B 33/02* (2006.01)

(52) U.S. Cl.
CPC .................................. *G11B 33/022* (2013.01)

(58) Field of Classification Search
None
See application file for complete search history.

(56) References Cited

U.S. PATENT DOCUMENTS 5,959,834 A * 9/1999 Chang .................. G11B 33/124
8,130,490 B2 * 3/2012 Jiang ....................... G06F 1/187 361/679.33
10,126,784 B2 * 11/2018 Hou ..................... H01H 27/002
2004/0066632 A1 * 4/2004 Fang ....................... G06F 1/184 361/727
2007/0042647 A1 * 2/2007 Chuang ............ H01R 13/62994 439/620.29
2007/0211422 A1 * 9/2007 Liu ......................... G06F 1/187 361/679.37
2007/0258224 A1 * 11/2007 Fang .................... H05K 7/1409 361/759
2011/0273837 A1 * 11/2011 Jiang ....................... G06F 1/187 361/679.37
2015/0012760 A1 * 1/2015 Shichi .................. H05K 7/1492 713/300

FOREIGN PATENT DOCUMENTS

CN 105993046 B 4/2019

* cited by examiner

*Primary Examiner* — William J Klimowicz
(74) *Attorney, Agent, or Firm* — ScienBiziP, P.C.

(57) ABSTRACT

A hard disk, a fixing device, and a hard disk module are provided. The hard disk includes a base shell, a main circuit board mounted on the base shell, a switch mounted on the main circuit board, and a triggering mechanism. The triggering mechanism includes a triggering rod. The triggering rod is slidably arranged on the base shell along a first direction. The triggering rod can move in the first direction to trigger the switch, thereby causing the main circuit board to power off the hard disk.

8 Claims, 5 Drawing Sheets

HARD DISK, FIXING DEVICE, AND HARD DISK MODULE

FIELD

The subject matter herein generally relates to fixing of data storage devices, and more particularly, to a hard disk, a fixing device, and a hard disk module.

BACKGROUND

Hot Swap, also known as hot plugging, refers to inserting a peripheral device (e.g., a hard disk) supporting hot swap into or removing the peripheral device from a system without shutting down or powering off the system. The normal operation and reliability of the system will not be affected. Thus, Hot Swap may be widely used in applications where powering off servers may be costly.

To realize the Hot Swap function, the electric current of the server should be reduced to a reasonable level. However, the control of the electric current is realized by an operation system, and when a user needs to remove the peripheral device from the server, the user should first operate the operation system, which may be inconvenient.

Therefore, there is a room for improvement in the art.

BRIEF DESCRIPTION OF THE DRAWINGS

Implementations of the present technology will now be described, by way of embodiment, with reference to the attached figures.

DETAILED DESCRIPTION

Figure 1:
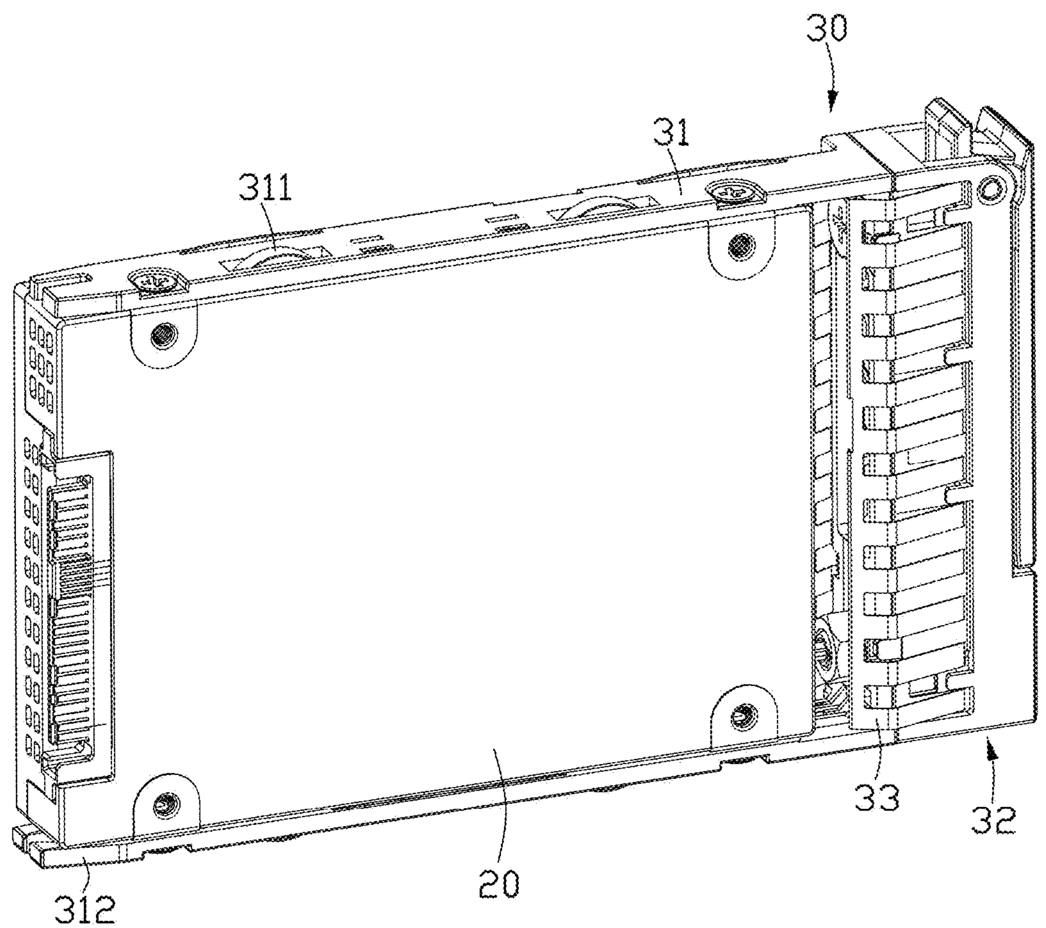
FIG. 1 is a diagrammatic view of a hard disk module according to an embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
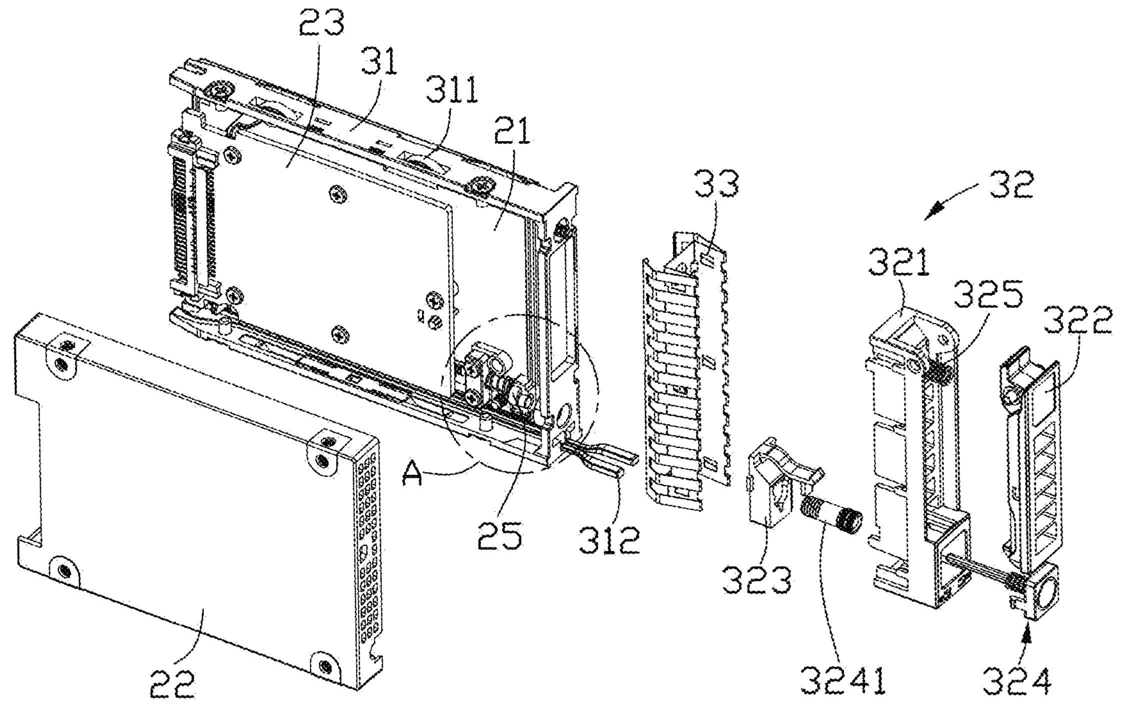
FIG. 2 is an exploded view of the hard disk module shown in FIG. 1.

Referring to FIGS. 1 and 2, an embodiment of the present application provides a hard disk module 100, which may be installed in a server (not shown). The hard disk module 100 includes a hard disk 20 and a fixing device 30. The hard disk 20 may be detachably installed in the fixing device 30.

Figure 3:
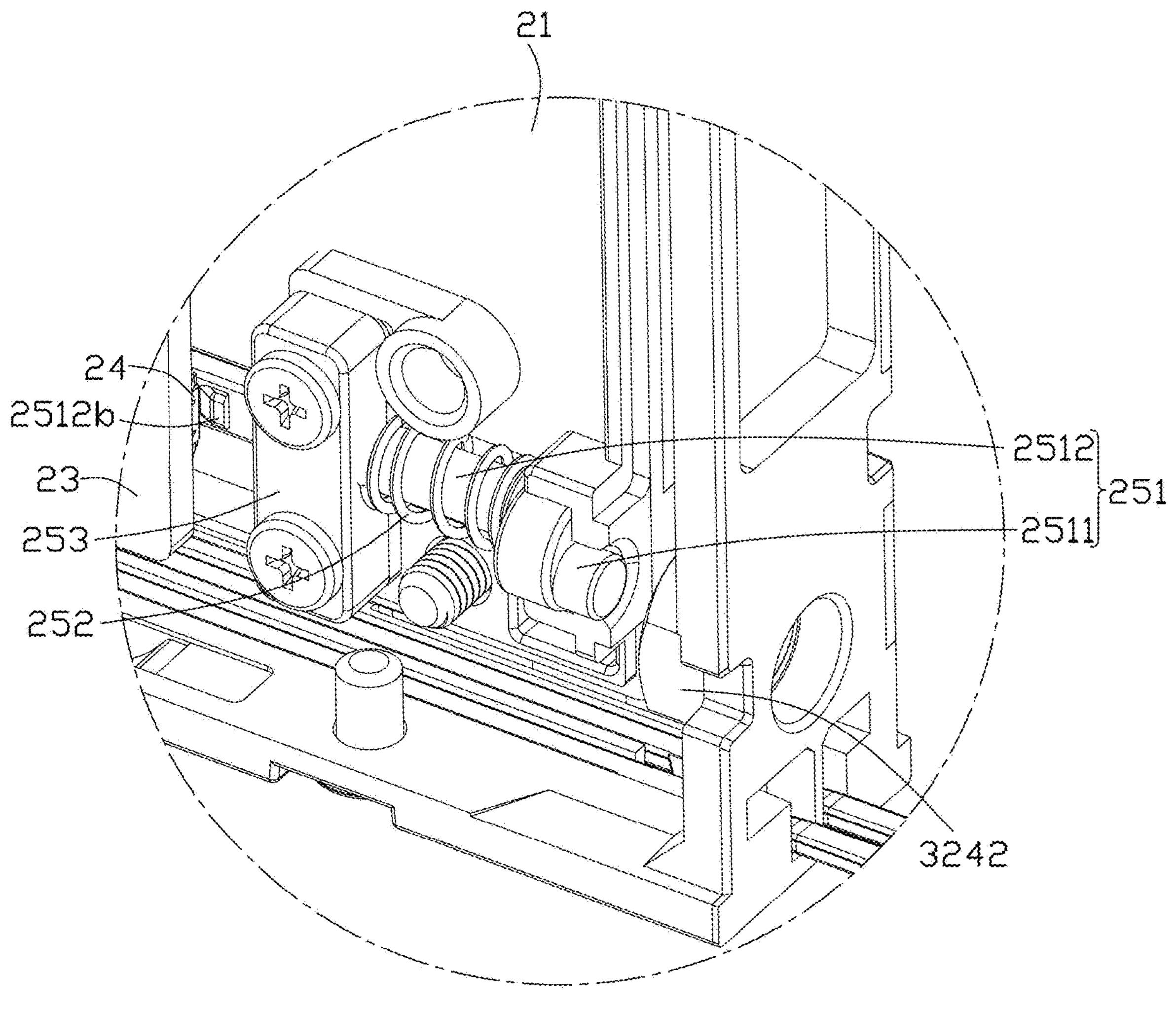
FIG. 3 is an enlarged view of portion A shown in FIG. 2.

Referring to FIGS. 2 and 3, in at least one embodiment, the hard disk 20 includes a base shell 21, a main circuit board 23, a switch 24, and a triggering mechanism 25. The main circuit board 23 is mounted on the base shell 21, and the switch 24 is mounted on the main circuit board 23. The switch 24 may be disposed between the base shell 21 and the main circuit board 23. The triggering mechanism 25 includes a triggering rod 251, which is slidably mounted on the base shell 21 along a first direction. The first direction may be the length direction of the hard disk 20. An end of the triggering rod 251 faces the switch 24. The triggering rod 251 may move toward the switch 24 along the first direction to trigger the switch 24, thereby causing the main circuit board 23 to power off the hard disk 20 to facilitate the subsequent hot plugging of the hard disk 20. Compared to the existing technology that the user should first operate an operation system of the server before removing the hard disk 20 from the server, the triggering mechanism 25 of the present application may move in the first direction to trigger the switch 24 to power off the hard disk 20 before the removal of the hard disk 20, thereby improving operational efficiency and avoiding inconvenient operation before hot plugging.

In at least one embodiment, the hard disk 20 further includes a cover shell 22, which is detachably connected to the base shell 21 through bolts (not shown). The cover shell 22 and the base shell 21 cooperatively define a chamber. The main circuit board 23 is installed in the chamber and fixed to an inner surface of the base shell 21 by bolts (not shown), thereby protecting the main circuit board 23 in the hard disk 20.

The hard disk 20 may further include a pressing block 253, which is disposed on the base shell 21. A surface of the pressing block 253 facing the base shell 21 defines an avoidance groove 2531. The triggering rod 251 extends through the avoidance groove 2531. The pressing block 253 may limit the movement of the triggering rod 251 in a second direction perpendicular to the first direction. The second direction may be the width direction of the hard disk 20. Thus, the pressing block 253 enables the trigger rod 251 to move only in the first direction, thereby improving the installation stability of the triggering rod 251 on the base shell 21.

Figure 4:
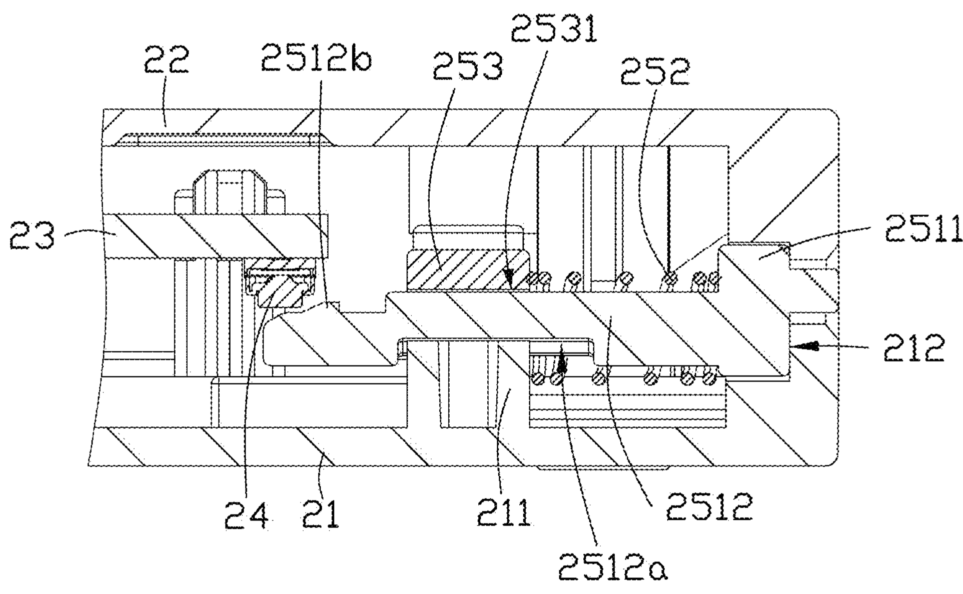
FIG. 4 is a cross-sectional view of a hard disk shown in FIG. 2.

In at least one embodiment, the inner surface of the base shell 21 is provided with a guiding rib 211, which protrudes toward the avoidance groove 2531. The guiding rib 211 is at least partially located in the avoidance groove 2531. Referring to FIGS. 3 and 4, the triggering rod 251 includes a pushing portion 2511 and a triggering portion 2512 connected to the pushing portion 2511. In a third direction perpendicular to the first and second directions, the triggering portion 2512 may be disposed between the base shell 21 and the main circuit board 23, and the third direction may be the thickness direction of the hard disk 20. The pushing portion 2511 is located at a side of the triggering portion 2512 away from the switch 24. A maximum width of the pushing portion 2511 is greater than that of the triggering portion 2512. A periphery of the pushing portion 2511 defines a first guiding groove **2512*a* extending along the first direction. The guiding rib 211 is slidably located in the first guiding groove 2512*a*, thereby facilitating the positioning and installation of the triggering rod 251 and further improving the stability of the triggering rod 251** during the movement.

In at least one embodiment, the inner surface of the base shell 21 further defines a second guiding groove 212. The pushing portion 2511 may slide into the second guiding groove 212, thereby facilitating the positioning and installation of the triggering rod 251 and further improving the stability of the triggering rod 251 during the movement.

In at least one embodiment, a triggering protrusion 2512*b* is provided at a side of the triggering portion 2512 facing the main circuit board 23. The triggering protrusion 2512*b* includes an inclined surface, and the inclined surface is inclined in a direction away from the pushing portion 2511 and toward the main circuit board 23. Before the triggering rod 251 is pushed, the triggering protrusion 2512*b* is separated from the switch 24. When the triggering rod 251 is pushed, the triggering protrusion 2512*b* moves toward and triggers the switch 24, such that the main circuit board 23 powers off the hard disk 20.

In at least one embodiment, the hard disk 20 further includes a first elastic member 252. An end of the first elastic member 252 is resisted against the pressing block 253, and another end of the first elastic member 252 is resisted against the pushing portion 2511. When the triggering rod 251 is pushed toward the switch 24, the first elastic member 252 is compressed, and the rebounding force of the first elastic member 252 may drive the triggering rod 251 to move away from the switch 24, thereby returning the triggering rod 251 to its original position.

Figure 5:
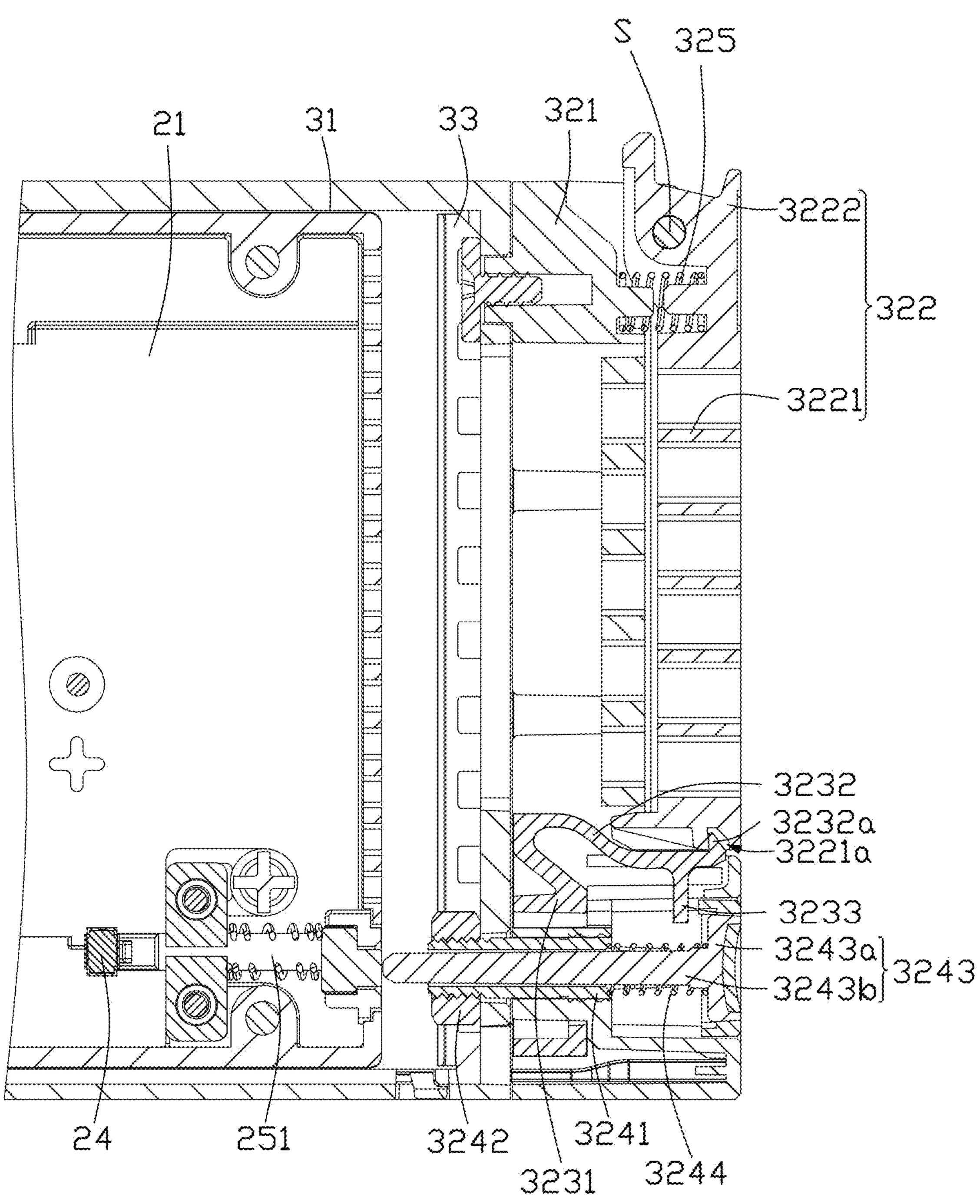
FIG. 5 is a cross-sectional view of the hard disk module shown in FIG. 1.

Referring to FIGS. 1 and 2, in at least one embodiment, the fixing device 30 includes a fixing frame 31 and a locking mechanism 32. The fixing frame 31 may install the hard disk 20 therein. The locking mechanism 32 includes an installation block 321, a hook arm 322, a locking block 323, and a pushing assembly 324. The installation block 321 is fixed to an end of the fixing frame 31. The hook arm 322 is rotatably connected to the installation block 321 by a shaft S, and may rotate relative to the installation block 321 about the shaft. For example, as shown in FIG. 5, the hook arm 322 may rotate relative to the installation block 321 in the clockwise direction about the shaft S, and may rotate relative to the installation block 321 in the counterclockwise direction about the shaft S. The hook arm 322 includes a locking handle 3221 and a locking hook 3222 connected to an end of the locking handle 3221. When the locking handle 3221 of the hook arm 322 rotates relative to the installation block 321 around the shaft S, the locking hook 3222 also rotates to lock with or unlock from the server. That is, the fixing device 30 has a locked state and an unlocked state. For example, the hook arm 322 rotates in the clockwise direction as shown in FIG. 5 to switch the fixing device 30 to the locked state, and further rotates in the counterclockwise direction as shown in FIG. 5 to switch the fixing device 30 to the unlocked state. The locking block 323 may engage with the locking handle 3221, thereby maintaining the fixing device 30 in the locked state. The locking block 323 may also disengage from the locking handle 3221, thereby releasing the hook arm 322 to enable the fixing device 30 to switch to the unlocked state.

In at least one embodiment, the fixing device 30 further includes an electromagnetic shielding frame 33. The electromagnetic shielding frame 33 is wrapped on the locking mechanism 32 to realize the effect of electromagnetic interference shielding. In at least one embodiment, the electromagnetic shielding frame 33 may be compressed between the installation block 321 and the fixing frame 31, thereby improving the installation stability of the electromagnetic shielding frame 33.

In at least one embodiment, an outer sidewall of the fixing frame 31 is provided with at least one elastic clamping sheet 311. The elastic clamping sheet 311 may be in an arc shaped. After the hard disk module 100 is installed into the server, the elastic clamping sheet 311 may eliminate the gap between the hard disk module 100 and the server, thereby improving the installation stability of the hard disk module 100.

A heat dissipation strip 312 may be provided at inner sidewall of the fixing frame 31 and resisted against the hard disk 20. The heat dissipation strip 312 further protrudes from the fixing frame 31. The heat dissipation strip 312 may dissipate heat generated by the hard disk 20 to the ambient environment, thereby improving the heat dissipation performance of the hard disk module 100.

Referring to FIGS. 2 and 5, in at least one embodiment, the pushing assembly 324 includes a pushing button 3243, which slidably extends through the installation block 321 and the locking block 323 along the first direction. When the pushing button 3243 moves along the first direction to push the triggering rod 251, the pushing button 3243 may further enable the locking block 323 to unlock the hook arm 322. As such, the hook arm 322 may rotate around the shaft S in the counterclockwise direction as shown in FIG. 5, thereby causing the fixing device 30 to switch from the locked state to the unlocked state. That is, the pushing of the pushing button 3243 and the unlocking of the fixing device 30 are simultaneously realized. Thus, when the hard disk 20 is fixed in the fixing device 30, the power off of the hard disk 20 and the unlocking of the fixing device 30 are simultaneously realized by pushing the pushing button 3243, thereby avoiding inconvenient operation before hot plugging.

In at least one embodiment, the locking block 323 includes a fixing portion 3231, a locking piece 3232, and an unlocking piece 3233. The fixing portion 3231 is connected to the installation block 321. The locking piece 3232 has elasticity. An end of the locking piece 3232 is connected to the fixing portion 3231, and another end of the locking piece 3232 away from the fixing portion 3231 is provided with a locking protrusion 3232*a*. Another end of the locking handle 3221 away from the locking hook 3222 defines a locking groove 3221*a*. The locking protrusion 3232*a* may be clamped with the locking groove 3221*a*, thereby allowing the locking piece 3232 to limit the position of the locking handle 3221 when the fixing device 30 in the locked state. An end of the unlocking piece 3233 is connected to the locking piece 3232, and another end of the unlocking piece 3233 forms a barrier facing the pushing button 3243. Thus, when the pushing button 3243 pushes the triggering rod 251 in the first direction, the pushing button 3243 simultaneously pushes the unlocking piece 3233, thereby deforming the locking piece 3232 and driving the locking protrusion 3232*a* of the locking piece 3232 to separate from the locking groove 3221*a*. Thus, the locking handle 3221 is unlocked from the locking piece 3232, and the hook arm 322 is allowed to rotate in the counterclockwise direction as shown in FIG. 5. As such, the fixing device 30 may be switched from the locked state to the unlocked state.

In at least one embodiment, the pushing assembly 324 includes a connecting tube 3241 and a connecting nut 3242 wrapped around the connecting tube 3241. An end of the connecting tube 3241 is fixed to the installation block 321, and another end of the connecting tube 3241 extends through the locking block 323 and is located in the fixing frame 31. The connecting nut 3242 is disposed in the fixing frame 31 and threaded with the connecting tube 3241, thereby fixing the fixing frame 31, the locking block 323, and the installation block 321 together. A portion (e.g., the upper section shown in the figures) of the installation block 321 is connected to the fixing frame 31 through bolts (not shown), and another portion (e.g., the lower section shown in the figures) of the installation block 321 is connected to the fixing frame 31 through the connecting tube 3241 and the connecting nut 3242, thereby simplifying the assembly process and the structure of the hard disk module 100.

In at least one embodiment, the pushing button 3243 includes a pushing rod 3243*b* and an installation portion 3243*a* connected to an end of the pushing rod 3243*b*. The pushing rod 3243*b* slidably extends through the connecting tube 3241, such that the connecting tube 3241 may have a guiding function for the pushing rod 3243*b*, thereby improving the operation stability of the pushing rod 3243*b*. Another end of the pushing rod 3243*b* away from the installation portion 3243*a* faces the triggering rod 251, such that the pushing rod 3243*b* pushes the triggering rod 251 in the first direction. The triggering structure is simple and may improve the operation convenience.

The pushing assembly 324 may further include a second elastic member 3244, which is wrapped around the pushing rod 3243*b*. An end of the second elastic member 3244 is resisted against the installation portion 3243*a*, and another end of the second elastic member 3244 is resisted against a side of the connecting tube 3241 facing the installation portion 3243*a*. When the pushing rod 3243*b* pushes the triggering rod 251 in the first direction, the second elastic member 3244 is compressed, and the rebounding force of the second elastic member 3244 may drive the installation portion 3243*a* to move away from the connecting tube 3241, thereby returning the pushing button 3243 to its original position.

In at least one embodiment, the locking mechanism 32 further includes a third elastic member 325. The third elastic member 325 may be adjacent to the shaft S. An end of the third elastic member 325 is resisted against the installation block 321, and another end of the third elastic member 325 is resisted against the locking handle 3221. When the locking piece 3232 locks the locking handle 3221, the third elastic member 325 is compressed. When the locking piece 3232 unlocks the locking handle 3221, the rebounding force of the third elastic member 325 may drive the locking handle 3221 to rotate about the shaft, thereby automatically switching the fixing device 30 from the locked state to the unlocked state.

With the above configuration, before hot plugging of the hard disk module 100, the pushing button 3243 is pushed by an external force, which drives the pushing rod 3243*b* to push the triggering rod 251, and the pushing button 3243 simultaneously enables the locking block 323 to unlock the hook arm 322. Then, the hook arm 322 may rotate around the shaft S to switch the fixing device 30 from the locked state to the unlocked state. The triggering rod 251 is slidably arranged on the base shell 21 in the first direction. When the triggering rod 251 moves toward and triggers the switch 24, the main circuit board 23 powers off the hard disk 20. In the present application, the power off of the hard disk 20 and the unlocking of the fixing device 30 are simultaneously realized by pushing the pushing button 3243, thereby avoiding inconvenient operation before hot plugging.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A hard disk module comprising:

a hard disk, a base shell, a main circuit board mounted on the base shell, a switch mounted on the main circuit board, and a triggering mechanism, wherein the triggering mechanism comprises a triggering rod, the triggering rod is slidably arranged on the base shell along a first direction, the triggering rod is configured to move in the first direction to trigger the switch, thereby causing the main circuit board to power off the hard disk; and a fixing device comprising a fixing frame configured to install the hard disk and a locking mechanism, wherein the locking mechanism comprises:

an installation block fixed to an end of the fixing frame;

a hook arm rotatably connected to the installation block by a shaft, wherein the hook arm comprises a locking handle and a locking hook connected to an end of the locking handle, the locking handle is configured to rotate relative to the installation block about the shaft, thereby driving the locking hook to switching the fixing device between a locked state and an unlocked state;

a locking block configured to engage with or disengage from the locking handle; and a pushing assembly comprising a pushing button, wherein the pushing button slidably extends through the installation block and the locking block in the first direction, and the pushing button is configured to push the triggering rod along the first direction and drive the locking block to disengage from the locking handle.

2. The hard disk module according to claim 1, wherein the hard disk module further comprises:

a pressing block disposed on the base shell and comprising an avoidance groove on a surface of the pressing block facing the base shell, wherein the triggering rod extends through the avoidance groove, and the pressing block is configured to limit a movement of the triggering rod in a second direction perpendicular to the first direction.

3. The hard disk module according to claim 2, wherein the base shell comprises a guiding rib, the guiding rib is at least partially located in the avoidance groove; the triggering rod comprises a pushing portion and a triggering portion connected to the pushing portion, the pushing portion is located at a side of the triggering portion away from the switch, a periphery of the pushing portion defines a first guiding groove extending in the first direction, and the guiding rib is slidably located in the first guiding groove.

4. The hard disk module according to claim 3, wherein the hard disk module further comprises:

a first elastic member, wherein an end of the first elastic member is resisted against the pressing block, another end of the first elastic member is resisted against the pushing portion, and the first elastic member is configured to drive the triggering rod to move away from the switch.

5. The hard disk module according to claim 1, wherein the locking block comprises a fixing portion, a locking piece, and an unlocking piece, the fixing portion is connected to the installation block, the locking piece is deformable, an end of the locking piece is connected to the fixing portion, another end of the locking piece away from the fixing portion is provided with a locking protrusion, another end of the locking handle away from the locking hook defines a locking groove, and the locking protrusion is configured to be clamped with the locking groove, thereby limiting a position of the locking handle when the fixing device is in the locked state; and an end of the unlocking piece is connected to the locking piece, another end of the unlocking piece forms a barrier facing the pushing button, and the pushing button is further configured to push the unlocking piece when the pushing button pushes the triggering rod in the first direction, thereby driving the locking protrusion to separate from the locking groove.

6. The hard disk module according to claim 1, wherein the pushing assembly further comprises a connecting tube and a connecting nut wrapped around the connecting tube, an end of the connecting tube is fixed to the installation block, another end of the connecting tube extends through the locking block and is located in the fixing frame, and the connecting nut is disposed in the fixing frame and threaded with the connecting tube, thereby fixing the fixing frame, the locking block, and the installation block to each other.

7. The hard disk module according to claim 6, wherein the pushing button comprises a pushing rod and an installation portion connected to an end of the pushing rod, the pushing rod slidably extends through the connecting tube, and another end of the pushing rod away from the installation portion faces the triggering rod, and the pushing rod is configured to push the triggering rod in the first direction.

8. The hard disk module according to claim 7, wherein the pushing assembly further comprises a second elastic member wrapped around the pushing rod, an end of the second elastic member is resisted against the installation portion, another end of the second elastic member is resisted against a side of the connecting tube facing the installation portion, and the second elastic member is configured to drive the installation portion to move away from the connecting tube.

* * * * *